United States Patent [19]

Murakami et al.

[11] 4,418,163

[45] Nov. 29, 1983

[54] WATER ABSORBING COMPOSITE COMPRISING INORGANIC POWDER ENCAPSULATED WITH A CROSSLINKED CARBOXYL POLYMER

[75] Inventors: Tetsuo Murakami; Hirotoshi Miyazaki; Hiroshi Harima, all of Ibaraki, Japan

[73] Assignee: Kuraray Co., Ltd., Kurashiki, Japan

[21] Appl. No.: 407,894

[22] Filed: Aug. 13, 1982

[30] Foreign Application Priority Data

Aug. 17, 1981 [JP] Japan ................. 56-129132

[51] Int. Cl.$^3$ .................. C08L 33/02; C08K 3/34; C08K 3/00
[52] U.S. Cl. .................... 523/205; 523/132; 523/202; 523/209; 524/423; 524/445; 524/446; 524/447; 524/449; 524/451; 524/456; 524/559; 525/381; 525/382; 428/407
[58] Field of Search ............... 523/132, 202, 205, 209; 428/407; 524/451, 449, 445, 446, 456, 425, 423, 549, 447; 525/381, 382

[56] References Cited

U.S. PATENT DOCUMENTS

| | | | |
|---|---|---|---|
| 3,165,486 | 1/1965 | Johnson | 524/549 |
| 4,076,673 | 2/1978 | Burkholder | 524/389 |
| 4,155,957 | 5/1979 | Sasayama | 428/394 |
| 4,211,851 | 7/1980 | Sasayama | 525/108 |
| 4,373,922 | 8/1982 | Shaffer | 525/437 |
| 4,382,999 | 5/1983 | Harima et al. | 525/196 |

FOREIGN PATENT DOCUMENTS

| | | | |
|---|---|---|---|
| 50-101439 | 8/1975 | Japan | 523/205 |
| 2080313 | 2/1982 | United Kingdom | 525/382 |
| 520962 | 7/1976 | U.S.S.R. | 523/132 |

OTHER PUBLICATIONS

Derwent Abst. 53349 B/29 Jun. 1979 (J54071087) CI Kasei KK.
Derwent Abst. 79157 C/45 Oct. 1980 (DT3015460) Kuraray KK.
Derwent Abst. 38747 D/22 Apr. 1981 (J56036504) Kuraray KK.
Derwent Abst. 72640 D/40 Aug. 1981 (J56104014) Hitachi.
Derwent Abst. 35577 E/18 Apr. 1982 (EP-50375) Kuraray KK.
Derwent Abst. 59739 E/29 Aug. 1982 (EP-55848) Kuraray KK.
Derwent Abst. 54881 E/26 Jun. 1982 (WP8201993) Meyer H.
Derwent Abst. 48784 E/24 May 1982 (J57072652) Kuraray KK.
Derwent Abst. 10713 E/06 Dec. 1981 (J56167757) Ci Kasei KK.

*Primary Examiner*—Melvyn I. Marquis
*Assistant Examiner*—Herbert J. Lilling
*Attorney, Agent, or Firm*—Oblon, Fisher, Spivak, McClelland & Maier

[57] ABSTRACT

A water absorbing composite comprises an inorganic powder, and a highly absorbent resin covering the whole surfaces of the individual particles of the inorganic powder. The resin is obtained by reacting with a basic substance a polymer containing as a monomeric constituent an $\alpha,\beta$-unsaturated compound having in its molecule one or two carboxyl groups, or one or two other groups convertible to a carboxyl group or groups, and by crosslinking the reaction product with a polyamine. The composite is useful as a water retaining agent for agriculture and horticulture, or as a dehydrating agent for oil.

16 Claims, No Drawings

WATER ABSORBING COMPOSITE COMPRISING INORGANIC POWDER ENCAPSULATED WITH A CROSSLINKED CARBOXYL POLYMER

BACKGROUND OF THE INVENTION

1. Field of the Invention

This invention relates to a highly durable and heat resistant water-absorbing composite which comprises an inorganic powder having particle surfaces covered totally by a highly absorbent resin which is obtained from a polymer containing as a monomeric constituent an $\alpha,\beta$-unsaturated compound having in its molecule one or two carboxyl groups, or one or two other groups convertible to a carboxyl group or groups, by reacting the polymer with a basic substance and crosslinking the reaction product with a polyamine. The composite is useful as a water retaining, absorbing or stopping agent, a dehydrating agent, a drying agent, or a wetting agent.

2. DESCRIPTION OF THE PRIOR ART

Various types of highly absorbent resins which can absorb several hundred times as much water as their own weight have recently been developed, and come to be used as a water retaining, absorbing or stopping agent, a drying agent or a wetting agent, or for other purposes. When these resins have absorbed water, however, they are sometimes too low in strength to exhibit their capacity satisfactorily. Moreover, they are almost equal to water in specific gravity when they have absorbed water. If any such resin is, for example, used for dehydrating oil, therefore, it is difficult to separate the water-bearing resin from the oil. In order to overcome this difficulty, Japanese laid-open patent specification No. 5022/1981, for example, proposes the use of a mixture of a highly absorbent resin powder and an organic or inorganic carrier which adhere to each other. The resin and the carrier, however, adhere to each other only at points of contact, and are very liable to separation from each other when their mixture is packed or transported, or mixed with any other material. Even if they remain adherent to each other on any such occasion, their points of contact are severed by the pressure created when they have absorbed water and become swollen. If the mixed material is, for example, used with soil in agriculture or horticulture, the absorption of water by the resin causes it to be separated from the carrier, and the pressure created by the swollen resin develop open spaces in the soil. The resin moves into such spaces, and is precipitated on the surface of the soil. The resin, thus, covers the surface of the soil around the roots of plants, and hinders the supply of sufficient air to the roots, resulting in their rotting.

If any such mixed material is used for dehydrating oil, the absorption of water by the resin causes it separation from the carrier, leaving a mere mixture of the resin and the carrier. The resin floats in the oil, and is difficult to separate therefrom, resulting in inefficient dehydration of oil.

In order to overcome these disadvantages, Japanese laid-open patent specification No. 91086/1978 proposes the covering or mixing of a water-insoluble base, such as paper, cotton, wood, cloth, a synthetic resin, soil, metal or glass, by or with a highly absorbent hydrogel composed mainly of the saponified product of an ethylene-vinyl ester-ethylene type unsaturated carboxylic acid copolymer to render the base capable of absorbing or retaining water. According to this patent specification, a hydrogel in the form of, for example, a film, fibers, beads or a fine powder is mixed with the base, or a water-soluble polymer capable of forming such a hydrogel is dissolved in water or the like, and mixed in the presence of a specific crosslinking agent, and the solution thereby obtained is coated on the base and dried. These materials, however, form a paste with the solubilization of the resin if they retain water for a long time, probably because a dialdehyde, epihalohydrin, diepoxy, triepoxy, diisocyanate or like compound is used as a crosslinking agent. Moreover, they lack durability under heat. It is, therefore, impossible to use them as a water retaining agent for agriculture or horticulture which is required to maintain its water absorbing power for six or twelve months or a longer time, while permitting transmission of air.

SUMMARY OF THE INVENTION

It is an object of this invention to provide a water absorbing composite comprising a highly absorbent resin and an inorganic powder which do not undergo separation from each other when it is manufactured, mixed with any other material, or used in water, oil or soil.

It is another object of this invention to provide a highly durable and heat resistant water absorbing composite having a high power of absorbing and retaining water, and capable of maintaining its water absorbing power for at least one year after it has absorbed water.

It is still another object of this invention to provide a water absorbing composite which is suitable for use in agriculture and horticulture.

According to this invention, these objects are attained by a composite which comprises an inorganic powder having particle surfaces covered totally by a highly absorbent resin which is obtained from a polymer containing as a monomeric constituent an $\alpha,\beta$-unsaturated compound havng in its molecule one or two carboxyl groups, or one or two other groups convertible to a carboxyl group or groups, by reacting the polymer with a basic substance and crosslinking the reaction product with a polyamine.

DETAILED DESCRIPTION OF THE INVENTION

For the composite of this invention, it is possible to employ the powder of any inorganic substance such as white carbon, synthetic silicate white carbon, basic magnesium carbonate, ultrafine magnesium silicate, light or heavy calcium carbonate, soft or hard clay, talc, vermiculite, pearlite, barium sulfate (baryte) or mica.

According to this invention, it is important that the absorbent resin cover the whole surfaces of the individual particles of the inorganic powder. If the resin in powdery form adheres to the surfaces of the inorganic particles merely at points of contact, it swells with water, and leaves the inorganic particles when the composite has absorbed water. Thus, it is impossible to obtain the results expected from this invention. If the powder of the resin is applied to the inorganic particles by a water-soluble binder, there is every likelihood, that, in most cases, the binder may dissolve, and the resin may separate from the inorganic powder, or the binder may prevent the resin from absorbing water satisfactorily.

If the water absorbing power of the resin is too small, the composite loses its water absorbing power, and is substantially nothing but an inorganic substance having a high power of absorbing water. It is only useful for a limited range of applications. If, on the other hand, the resin has too large a power of absorbing water, its strength is reduced when it has absorbed water, and the composite lacks durability. Moreover, the composite is substantially equal to water in specific gravity when it has absorbed water. Such a composite is only useful for a limited range of applications. Therefore, it is preferable that the absorbent composite has a power of absorbing 20 to 800, particularly 50 to 500, times as much distilled water as its own weight. While the water absorbing power of the resin per se depends on that which is required of the composite, it is generally preferable for the resin to be capable of absorbing 20 to 1,000, particularly 50 to 800, times as much water as its own weight.

The water absorbing composite of this invention can be prepared by mixing an inorganic powder into a solution containing a hydrophilic polymer and a crosslinking agent which insolubilizes the polymer and converts it to a highly absorbent resin, and drying and heat treating the mixture.

It is preferable to use as the hydrophilic polymer for the preparation of a highly absorbent resin a polymer containing as a monomeric constituent an $\alpha,\beta$-unsaturated compound having in its molecule one or two carboxyl groups, or one or two other groups convertible to a carboxyl group or groups, for example, carboxylate, carboxylic acid amide or imide, or carboxylic acid anhydride. The use of such a polymer is preferred for the preparation of a water absorbing composite which is satisfactory in water absorbing rate, water retaining power and durability.

Examples of the $\alpha,\beta$-unsaturated compounds include acrylic acid, methacrylic acid, acrylic or methacrylic amide, maleic anhydride, maleic acid, maleamide, maleimide, itaconic acid, crotonic acid, fumaric acid and mesaconic acid. It is possible to employ another monomer copolymerizable with the $\alpha,\beta$-unsaturated compound if the properties required of the absorbent resin are maintained. Examples of the copolymerizable monomrs include $\alpha$-olefins, and vinyl and vinylidene compounds, such as ethylene, propylene, isobutylene, 1-butylene, diisobutylene, methyl vinyl ether, styrene, vinyl acetate, acrylic and methacrylic esters, and acrylonitrile. In the event any such other monomer is also employed, it is advisable to ensure that the $\alpha,\beta$-unsaturated compound occupy at least 40 mol %, or preferably at least 50 mol %, of the total quantity of the monomers.

The polymer may be prepared by a customary method employing a radical polymerization catalyst. It is preferable to achieve a polymerization degree of 10 to 5,000, though there is no limitation in particular.

It is particularly preferable to employ an acrylic or methacrylic acid polymer, or a copolymer of an $\alpha$-olefin or vinyl compound and maleic anhydride. It is advisable to improve the hydrophilic nature of any such polymer or copolymer by reacting it with a hydroxide, oxide or carbonate of sodium, potassium, magnesium, calcium, barium or any other alkali or alkaline earth metal, ammonia, amine, or the like. This reaction can be achieved by dissolving or dispersing, for example, any such alkali metal compound in a solvent for the polymer or copolymer, preferably water, and adding the polymer or copolymer into the solution while it is being stirred. It is particularly preferable to use sodium or potassium hydroxide, or ammonia from the standpoint of reactivity, and the durability of the high water absorbing power to be achieved. It is advisable from the standpoint of durability to employ any such basic substance in such a quantity that 40 to 100%, or preferably 50 to 80%, of the carboxyl group or groups in the hydrophilic polymer, or any other group or groups convertible to a carboxyl group or groups may form a salt.

The following is a list of examples of the preferred hydrophilic polymers for use in the preparation of the highly absorbent resins:

(1) Product obtained when a maleic acid copolymer between maleic acid, maleic anhydride or a maleic acid derivative such as maleamide or maleimide, and a linear or branched $\alpha$-olefin having 2 to 12, or preferably 2 to 8, carbon atoms, such as ethylene, propylene, butylene, isobutylene or diisobutylene, is reacted with an alkali metal compound, an alkaline earth metal compound, ammonia or an amine;

(2) Product obtained when a maleic acid copolymer between maleic acid or a derivative thereof, and one vinyl or vinylidene compound selected from among styrene, vinyl acetate, methyl vinyl ether, acrylic and methacrylic esters and acrylonitrile is reacted with an alkali metal compound, an alkaline earth metal compound, ammonia or an amine;

(3) Product of the reaction between an acrylic polymer such as an acrylic or methacrylic acid polymer, and an alkali metal compound, an alkaline earth metal compound, ammonia or an amine; and (4) Product obtained when an acrylic copolymer between acrylic or methacrylic acid and a vinyl or vinylidene compound selected from among those listed at (2) above is reacted with an alkali metal compound, an alkaline earth metal compound, ammonia or an amine.

The product of reaction between an isobutylene-maleic anhydride copolymer and an alkali metal hydroxide is preferred from the standpoint of water absorption and durability. In order to achieve the objects of this invention very easily, it is particularly preferable to employ an alternating isobutylene-maleic anhydride copolymer, since isobutylene provides two methyl side chains, while maleic anhydride provides two carboxylic acids, and one of the carboxylic acids forms a salt, while the other serves mainly for crosslinking purposes, because of their different dissociability, so that the former may provide water absorbing property, while the latter contributes to improved durability and heat resistance.

The product obtained by reacting the polymer with the basic substance is, then, subjected to a crosslinking reaction by a polyamine. It is possible to use any other crosslinking agent, such as a polyepoxy compound, a urea resin, a melamine resin, a polyhydric alcohol, amino-alcohol, a polyisocyanate or a polyhalohydrin. If any such crosslinking agent, other than a polyamine, is used, crosslinking is effected by ester or amide linkages which are liable to hydrolysis, resulting in a very poor water absorbing composite lacking durability when it has absorbed water. If a polyamine is employed, however, crosslinking is achieved by an ionic bond between the carboxyl group and the polyamine, and an amide linkage formed by dehydration of the two functional groups, resulting in a water absorbing composite having a high degree of physical and chemical stability, and therefore, a high degree of durability.

The polyamine which can appropriately be used in accordance with this invention is a hydrophilic, or preferably water-soluble, amine represented by the general formula $H_2N(CH_2-CH_2NH)_nH$ where n is an integer of at least 1. The preferred examples of the polyamines include ethylenediamine, diethylenetriamine, triethylenetetramine, tetraethylenepentamine, pentaethylenehexamine, and a polyethyleneimine having a molecular weight not higher than 5,000. The polyethyleneimine may be either branched or linear.

The crosslinking reaction takes place if the crosslinking agent is added to the reaction product of the polymer and the basic substance, or a preferably aqueous solution thereof. It is preferable to perform drying and heat treatment. The crosslinking agent may be employed in the quantity of less than 10 parts by weight for 100 parts by weight of the hydrophilic polymer, depending on the hydrophilic polymer, the crosslinking agent, the crosslinking conditions, the water absorbing power of the composite to be produced, and its use. It is particularly preferable to employ 0.005 to 2 parts by weight of the crosslinking agent.

It is preferable to manufacture the composite of this invention by dissolving the hydrophilic polymer in water or another solvent, dissolving the crosslinking agent in the polymer solution, and dispersing the inorganic powder in the solution, followed by drying and heat treatment. The product is, then, crushed into particles having a desired diameter so that it may be used for a variety of applications.

If too small a quantity of the hydrophilic polymer is employed, it is impossible to obtain a composite having a satisfactorily large water absorbing power. If, on the other hand, the quantity of the polymer is too large, there is obtained a composite from which the highly absorbent resin is separated by a shearing force when it has absorbed water, and which is substantially equal to water in specific gravity when it has absorbed water. Therefore, it is preferable to employ the hydrophilic polymer in such a quantity that the composite may contain 3 to 500, or more preferably 10 to 400, parts by weight of the highly absorbent resin for 100 parts by weight of the inorganic powder.

The water absorbing power of the composite according to this invention can be varied in a wide range if the proportions of the hydrophilic polymer, the crosslinking agent and the inorganic powder are appropriately controlled. Thus, the composite can be effectively used alone or in combination with soil, rubber, plastics or the like to form a water retaining, absorbing or stopping agent, a dehydrating agent, a wetting agent or a drying agent. More particularly, it is useful as a water retaining agent for agriculture and horticulture.

The water absorbing composite of this invention may, for example, be used as a water retaining agent for a farm, a flowerpot, a seedbed, or a lawn in a park or golf course. In this case, it is used in the form of a dry powder or particles containing water, and mixed with soil or sand. The composite absorbs water, and retains it for supplying an adequate quantity of water to the roots of plants to promote their growth. The composite retains its water absorbing power for at least 12 months.

A highly absorbent resin powder, or a mixture of any such powder and an inorganic substance bonded to each other has hitherto been used, but presented a lot of problems. The resin becomes soft and light by absorbing irrigation water or rain, and the soil particles develop gaps by absorbing water and swelling with it. The resin moves through those gaps, and rise to the soil surface. The resin may flow away on a sloping land, or cover the soil surface on a flat land, thereby preventing transmission of air into the soil, resulting in the rotting of the roots of the plants. These problems do not arise from the water absorbing composite of this invention.

It is possible to use the water absorbing composite of this invention by burying seeds or roots of a plant therein. The composite of this invention is also expected to be a useful water retaining agent for tree planting in a sandy place, such as a desert.

The water absorbing agent of this invention is particularly useful as a water retaining agent for agriculture and horticulture, as hereinabove described. It can, however, be also used as a dehydrating agent for removing water from an organic solvent or oil, or as a water stopping agent for a sandbag. Although a mere highly absorbent resin powder is difficult to separate from an organic solvent or oil for floating therein when it has absorbed water, the composite of this invention which has absorbed water can be easily separated from an organic solvent or oil, since there is a great difference in specific gravity between the composite and the solvent or oil. When the composite of this invention is used as a water stopping agent, it may be mixed into the sand in sandbags used against a flood. Even if the quantity of the composite is insufficient, it closes the gaps around the sand particles upon absorbing water to thereby exhibit its water stopping function.

The invention will now be described more specifically with reference to several non-limitative examples thereof, in which "parts" are shown "by weight", unless otherwise noted.

EXAMPLE 1

A uniform aqueous solution of a sodium salt of an isobutylene-maleic anhydride copolymer was prepared by stirring at a temperature of 80° C. 100 parts of an alternating isobutylene-maleic anhydride copolymer having a molar isobutylene to maleic anhydride ratio of 1:1, and a molecular weight of about 160,000 (ISOBAN-10 of KURARAY ISOPRENE CHEMICAL CO., LTD., Japan), 32 parts of sodium hydroxide, which quantity was required to form a salt from about 60 mol % of the carboxyl groups based on maleic anhydride, and 500 parts of water. A polyethyleneimine having a molecular weight of 1,200 (SP-012 of JAPAN CATALYTIC CHEMICAL INDUSTRY CO., LTD., Japan) was added into the aqueous solution to produce a highly absorbent resin capable of absorbing about 140 times as much water as its own weight after drying and heat treatment. The quantity of the polyethyleneimine is shown in TABLE 1. Then, kaolin (NN KAOLIN of TSUCHIYA KAOLIN INDUSTRIAL CO., LTD., Japan), of which the quantity is shown in TABLE 1, was put into the solution. The resulting mixture was dried on an iron plate at about 120° C., and heat treated in a hot air drier at 160° C. for 16 hours. The product was crushed into particles capable of passing entirely through a 20-mesh wire net to yield a powdery water absorbing composite.

One gram of the composite and 1,000 g of distilled water were placed in a one-liter beaker, and the beaker was left at rest for two hours. The resulting dispersion was subjected to filtration by a 200-mesh nylon cloth. The weight of the water-bearing composite thus separated was measured to determine the water absorbing power of the composite. The results are shown in TABLE 1. TABLE 1 also shows the water absorbing power of the highly absorbent resin employed to cover the inorganic power.

TABLE 1

| Sample No. | Kaolin (parts) | Isobutylene-maleic anhydride copolymer (parts) | Polyethyleneimine (% of the copolymer) | Water absorbing power of composite (times) | Water absorbing power of highly absorbent resin (times) |
| --- | --- | --- | --- | --- | --- |
| 1 | 0 | 100 | 0.45 | — | 150 |
| 2 | 100 | 50 | 0.72 | 54 | 145 |
| 3 | " | 100 | 0.60 | 71 | 132 |
| 4 | " | 200 | 0.52 | 96 | 137 |
| 5 | " | 300 | 0.49 | 109 | 140 |
| 6 | " | 400 | 0.48 | 118 | 143 |
| 7 | " | 500 | 0.47 | 116 | 136 |
| 8 | " | 600 | 0.46 | 121 | 138 |

A dispersion containing 1 g of Sample No. 4 composite in 250 g of water was sealed in a container against vaporization, and the container was immersed in a temperature controlled bath having a constant temperature of 70° C. This test was conducted to see how the water-bearing composite would change under heat. It did not undergo any change after 90 days, nor did its water absorbing power change appreciably. It was confirmed that the water-bearing composite was excellent in durability at an elevated temperature.

Sample No. 4 was left in a bath of air at 180° C. for 30 hours, and its water absorbing power and heat resistance were examined. Its water absorbing power of 95 times did not indicate any appreciable change, and its heat resistance was found excellent.

USE EXAMPLE 1

(As a Water Retaining Agent for Agriculture and Horticulture)

Two parts of Sample No. 2 obtaned in EXAMPLE 1 were mixed carefully with 500 parts of Kanuma soil (soil obtained in or about the city of Kanuma, Tochigi Pref., Japan, and draining well) to prepare soil A for growing sunflowers. For comparison purposes, soil B was prepared by mixing two parts of Sample No. 1 (highly absorbent resin) obtained in EXAMPLE 1, and 500 parts of Kanuma soil, and soil C was prepared from Kanuma soil alone.

Five hundred grams of each soil were placed in a one-liter transparent cylindrical container, and sunflower seeds were planted in the soil. Water was supplied whenever the bottom of each container had lost water. The germination ratio of sunflowers, and the degree of their growth were examined. The height of sunflowers was measured after one month of germination, and their height again and their root weight ratio after two months. The results are shown in TABLE 2.

TABLE 2

| Soil | Germination ratio*1 | Height after one month | Height after two months | Root weight ratio*2 after two months |
| --- | --- | --- | --- | --- |
| A | 25/25 | 16 cm | 21 cm | 0.28 |
| B*3 | 23/25 | 12 cm | 14 cm | 0.22 |
| C | 19/25 | 9 cm | 13 cm | 0.22 |

Note:
*1 Number of seeds germinated/number of seeds planted;
*2 Root weight/whole weight; and
*3 As time passed by, the water-bearing resin rose to the soil surface, and covered it around the roots.

As is obvious from TABLE 2, soil A containing the water absorbing composite of this invention showed an extremely high germination ratio of sunflowers, and a markedly higher degree of sunflower growth than any other soil. Soil B containing the highly absorbent resin per se showed a high germination ratio, but a degree of growth hardly differing from that achieved by soil C consisting solely of Kanuma soil. This was apparently due to the prevention of air permeation into the soil around the roots by the water-bearing resin which had risen to the soil surface and covered the soil surface around the roots with the lapse of time. Similar tests were repeated by supplying a constant quantity of water every day. Substantially the same results were obtained for the germination ratio, but the majority of the sunflowers in soil B had rotten roots within one month of germination, while the sunflowers grown in soil A did not have any rotten root.

USE EXAMPLE 2

(As a Dehydrating Agent for an Organic Solvent)

The dehydrating power of Sample No. 2 was examined. A transparent cylindrical column having a diameter of 5 cm was filled with 100 g of Sample No. 2 obtained in EXAMPLE 1, and a paint thinner comprising a mixture of 70% of toluene, 5% of methyl isobutyl keton, 5% of acetone, 5% of methyl alcohol, 5% of butyl alcohol and 10% of ethyl acetate, and having a water content of 1.0% was introduced into the column through its top at a rate of 40 ml per minute, and removed through its bottom. The water content of the thinner was examined after 60 minutes, and the condition of the composite in the column was also checked.

For comparison purposes, similar tests were conducted on Sample No. 1 (highly absorbent resin), and a clay-resin mixture prepared by mixing 100 parts of clay into 50 parts of Sample No. 1 resin in an aqueous/alcoholic solution of polyvinyl alcohol, heating the mixture and bonding the clay and the resin together with an adhesive.

The results are shown in TABLE 3.

TABLE 3

| Dehydrating agent | Water content of thinner after 60 min. (%) | Condition of dehydrating agent in column |
| --- | --- | --- |
| Composite | 0.15 | No change was observed after four liters of the thinner had been introduced (i.e., after 100 min.). The thinner showed a water content of 0.20% at that time. |
| Resin | 0.22* | A part of the resin swelled with water, and clogged the column after 1.6 liters of the thinner had been introduced (i.e., after 40 min.). |
| Clay-resin mixture | 0.42 | Partial separation of the clay from the resin occurred, and the thinner became turbid. A low rate of water absorption. |

*After 40 minutes, the column was stirred for the continued thinner introduction, and examination of its water content. The other dehydrating agents were not stirred, but kept at rest.

COMPARATIVE EXAMPLE 1

Glycerol diglycidyl ether having an epoxy equivalent of 145 was added as a crosslinking agent into the aqueous solution of the sodium salt of the isobutylene-maleic anhydride copolymer prepared in EXAMPLE 1, in the quantity of 1.47% by weight based on the copolymer weight. Kaolin was mixed into the solution in the quantity of 100 parts for 200 parts of the copolymer. Then, the procedures of EXAMPLE 1 were repeated to prepare a water absorbing composite.

Several other water absorbing composites were likewise prepared by employing polyvinyl alcohol, ethylene glycol, 3-hydroxypropylamine, tolylene diisocyanate and ethylene glycol dihalohydrin each in the quantity shown in TABLE 4, instead of glycerol diglycidyl ether.

A mixture containing 1 g of each of these composites in 250 g of water was sealed in a container against vaporization, and the container was left at ordinary room temperature, and also immersed in a bath maintained at a constant temperature of 70° C. Thus, each water-bearing composite was checked for any change in shape with the lapse of time at ordinary room temperature and at an elevated temperature, and the time which had passed before the resin in the composite started to be wholly or partially dissolved was examined. The results are shown in TABLE 4. A similar test was also conducted on Sample No. 4 of EXAMPLE 1 obtained by employing polyethyleneimine as a crosslinking agent.

TABLE 4

| Crosslinking agent | Its quantity (wt. % of copolymer) | Water absorbing power of composite (times) | Dissolution of resin in composite | | Remarks |
| --- | --- | --- | --- | --- | --- |
| | | | At ordinary room temp. | At 70° C. | |
| Polyethyleneimine | 0.52 | 96 | None for a year. | None for two months. | *1 |
| Glycerol diglycidyl ether | 1.47 | 89 | Partly after three months. | After seven days. | |
| Polyvinyl alcohol | 1.20 | 106 | Partly after two months. | After ten days. | |
| 3-Hydroxypropylamine | 1.05 | 92 | After 15 days. | After two days. | |
| Toluidine diisocyanate | 2.40 | 83 | After two months. | After seven days. | |
| Ethylene glycol dichlorohydrin | 1.78 | 75 | After one month. | After four days. | |

*¹Sample No. 4 of EXAMPLE 1.

COMPARATIVE EXAMPLE 2

Mixtures of barium sulfate and a highly absorbent resin were prepared by mixing 100 parts each of a commercially available highly absorbent starch resin having a water absorbing power of 350 times (SANWET IM-300 of SANYO CHEMICAL INDUSTRIAL CO., LTD., Japan), or a highly absorbent resin composed of a saponified vinyl ester-acrylic acid copolymer having a water absorbing power of 400 times (SUMIKAGEL of SUMITOMO CHEMICAL INDUSTRIAL CO., LTD., Japan) with 100 parts of barium sulfate powder, and bonding the resin and the sulfate powder together employing an ethyl acetate solution of polyvinyl acetate as a binder. The former mixture containing SUNWET showed a water absorbing power of 105 times, while the latter containing SUMIKAGEL exhibited a water absorbing power of 120 times. In other words, the latter mixture could absorb 120 times as much water as its own weight.

These mixtures were left in water at ordinary room temperature. The resin in the former mixture was partially dissolved after three months, while the resin in the latter mixture was dissolved after 20 days.

EXAMPLE 2

One hundred parts of sodium polyacrylate (ARONBIS S of JAPAN PURE MEDICINE CO., LTD., Japan) were dissolved in 300 parts of water, and 0.6 part of the same polyethyleneimine as had been used in EXAMPLE 1 was added into the solution. Then, 100 parts of barium sulfate (i.e., the same quantity as that of sodium polyacrylate) were mixed into the solution. The procedures of EXAMPLE 1 were thereafter repeated to prepare a water absorbing composite. It showed a power of absorbing 110 times as much as water as its own weight.

One gram of the composite was put in a 200-ml beaker, and 100 ml of water were introduced thereinto, so that the composite might absorb water. Then, the water-bearing composite was placed in a hot air drier having a temperature of 40° C. so that water might be vaporized. This sequence of water absorption and desorption was repeated 20 times. The composite thereafter showed a nearly equal water absorbing power of 106 times, and was found excellent in durability.

What is claimed is:

1. A water absorbing composite comprising:
    an inorganic powder; and
    a highly absorbent resin;
    wherein said highly absorbent resin covers totally the surfaces of the individual particles of said powder, and
    wherein said resin is obtained by reacting a basic substance with a polymer containing at least 40 mol % of repeating monomeric units of an $\alpha,\beta$-unsaturated compound having in its molecule one or two carbonyl groups, on one or two other groups convertible to a carboxyl group or groups, and then crosslinking the reaction product with a polyamine.

2. A composite as set forth in claim 1, wherein said inorganic powder is the powder of at least one inorganic substance selected from the group consisting of white carbon, magnesium carbonate, magnesium silicate, calcium carbonate, clay, talc, vermiculite, pearlite, barium sulfate and mica.

3. A composite as set forth in claim 1, wherein said polymer is a maleic acid copolymer.

4. A composite as set forth in claim 3, wherein said copolymer is a copolymer of an $\alpha$-olefin and maleic anhydride.

5. A composite as set forth in claim 4, wherein said copolymer is an alternating copolymer of isobutylene and maleic anhydride.

6. A composite as set forth in claim 3, wherein said copolymer is composed of at least one kind of monomer selected from the group consisting of styrene, vinyl acetate, methyl vinyl ether, acrylic ester, methacrylic ester and acrylonitrile, and maleic anhydride.

7. A composite as set forth in claim 1, wherein said polymer is an acrylic polymer.

8. A composite as set forth in claim 7, wherein said acrylic polymer is a polyacrylic acid.

9. A composite as set forth in claim 3 or 7, wherein said basic substance is an alkali metal hydroxide.

10. A composite as set forth in claim 3 or 7, wherein said polyamine is an amine of the general formula:

$$H_2N\text{---}(CH_2\text{---}CH_2\text{---}NH)_n H$$

where n is an integer of at least 1.

11. A composite as set forth in claim 1, wherein said highly absorbent resin has a power of absorbing from 20 to 1,000 times of its own weight.

12. A composite as set forth in claim 1, wherein the said composite contains from 3 to 500 parts by weight of the highly absorbent resin for 100 parts by weight of the inorganic powder.

13. A composite as set forth in claim 1, wherein said composite has a power of absorbing from 20 to 800 times of its own weight.

14. A composite as set forth in claim 1, wherein a substantially equal water absorbing power is maintained for at least twelve months at a temperature of 70° C. when said composite has absorbed water.

15. A water retaining agent for agriculture and horticulture comprising the composite of claim 11.

16. A dehydrating agent for oil comprising the composite of claim 1.

* * * * *